(12) United States Patent
Ryals et al.

(10) Patent No.: US 7,991,125 B2
(45) Date of Patent: Aug. 2, 2011

(54) ADAPTIVE INCOMING CALL PROCESSING

(75) Inventors: Steven Ryals, Birmingham, AL (US); Wilson Ryals, Trussville, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1197 days.

(21) Appl. No.: 11/621,399

(22) Filed: Jan. 9, 2007

(65) Prior Publication Data

US 2008/0165948 A1    Jul. 10, 2008

(51) Int. Cl.
*H04M 1/64* (2006.01)
(52) U.S. Cl. .......................... 379/70; 379/133
(58) Field of Classification Search .......... 379/142.01, 379/142.04, 142.06, 201.01, 201.02, 211.01, 379/212.01, 218.01, 88.19, 88.2, 88.22, 88.23, 379/88.25, 76, 70, 100.05, 133, 134, 135, 379/138, 114.01, 114.13, 88.11, 88.13; 704/251
See application file for complete search history.

(56) References Cited

U.S. PATENT DOCUMENTS 6,016,336 A * 1/2000 Hanson ...................... 379/88.23

OTHER PUBLICATIONS

"BellSouth Centrex Product Description" http://www.bellsouth.com/business/products/data/centrex/centrex_prod_main.html; accessed Aug. 8, 2006.
"BellSouth Centrex Features" http://www.bellsouth.com/business/products/data/centrex/centrex_prod_features_3.html; accessed Aug. 8, 2006.
"BellSouth Preferred Call Forwarding" http://interconnection.bellsouth.com/products_and_services/local/resale/pref_cf.html• accessed Aug. 8, 2006.
"Centrex Calling Features User Guide" http://conversent.com/website/cs/UserGuideCentrex/asp; accessed Aug. 8, 2006.
"Phonom VoIP Voice Over Broadband" *IP Centrex Features* http://www.cavtel.com/business/coip/ip_centrex_feat.shtml; Accessed Aug. 8, 2006.
"Centrex" *Fibernet Business* http://www.wvfibernet.net/business_centrex.php; Accessed Aug. 8, 2006.
XO™ Centrex Feature Activation Guide, 2003.

* cited by examiner

*Primary Examiner* — Olisa Anwah
(74) *Attorney, Agent, or Firm* — Myers Bigel Sibley & Sajovec

(57) ABSTRACT

Methods of processing incoming telephone calls include receiving an incoming telephone call from a caller, identifying the caller associated with the incoming telephone call, and processing the incoming call in response to a call handling rule generated in response to a menu selection made in a previous incoming call from the caller. Processing the incoming call in response to the generated call handling rule may include playing an interactive voice response menu to the incoming caller. The interactive voice response menu may include at least one menu option included in the interactive voice response menu in response to the call handling rule. Corresponding call handling units and computer program products are also provided.

14 Claims, 3 Drawing Sheets

ADAPTIVE INCOMING CALL PROCESSING

FIELD OF THE INVENTION

The present invention relates to telephone call processing. In particular, the present invention relates to methods and systems for handling incoming telephone calls.

BACKGROUND

In a telephone system, incoming calls may be handled a number of different ways, depending on the particular type of customer premises equipment (CPE) that is being used. For example, mid- to large-size enterprises may have one or more private branch exchanges (PBX) installed on premises that receive incoming calls and that provide such functions as interactive voice response (IVR), voicemail, and/or automatic call forwarding. In some cases, particularly for small companies and entities for which it is impractical to purchase and install a PBX, some PBX-like services may be provided at the switch level by a telephone company. Such services, which are typically referred to as Centrex-type services, may mimic the operation of a PBX, and may provide advanced call handling capabilities, IVR, voicemail, and other features without the necessity of installing expensive equipment. Some advanced calling features, such as call forwarding, are provided by Advanced Intelligent Network (AIN) functionality that is included in some current telephone systems.

In addition to PBX and Centrex-based call handling, some advanced call handling functions may be provided by a Voice over IP (VoIP) internet telephony system. Currently, to provide Internet telephony communications to a subscriber, a subscriber must obtain equipment, such as Integrated Access Devices (IADs), Analog Terminal Adapters (ATAs), telephone adapters (TAs) and the like, to be installed at the subscriber's premises, for example, a customer's home. The equipment is needed to support a voice path within the premises and through the broadband connection, for example, a digital subscriber line (DSL) connection, back to the Internet Service Provider (ISP). Once the necessary equipment is installed, customers/subscribers can connect their existing analog phones, for example, Plain Old Telephone Service (POTS) phones, to the Analog Terminal Adaptors (ATAs) or telephone adapters (TAs) to originate and/or receive calls using Internet telephony, for example, over a VoIP line. A VoIP dial-tone is provided by the telephone adaptor (TA) to any phone extensions with ATAs connected. Incoming call processing may be performed at the customer premises or at a remote server with which the IAD communicates.

In addition to traditional PBX and Centrex-like services, VoIP systems provide users with certain functionality not typically available to users of traditional analog telephone services. For example, a user of a VoIP system may be able to customize incoming and outgoing call handling procedures, call preferences, call permissions, etc., using an IP interface to a feature server (application server). Call notifications may be provided to a user via instant messaging, and a user may be able to adjust call handling for an incoming call via an IP connection with the VoIP server without answering the call.

SUMMARY

Some embodiments of the invention provide methods of processing incoming telephone calls including receiving an incoming telephone call from a caller, identifying the caller associated with the incoming telephone call, and processing the incoming call in response to a call handling rule generated in response to a menu selection made in a previous incoming call from the caller. Processing the incoming call in response to the generated call handling rule may include playing an interactive voice response menu to the incoming caller. The interactive voice response menu may include at least one menu option included in the interactive voice response menu in response to the call handling rule.

Processing the incoming call in response to the generated call handling rule may include transferring the incoming call to an extension defined in the call handling rule. The methods may further include playing a message to the caller inviting the caller to indicate that they would like to be transferred to an alternate destination instead of being transferred to the extension defined in the call handling rule.

Processing the incoming call in response to the generated call handling rule may include playing an interactive voice response menu to the incoming caller. The interactive voice response menu may include a menu option for transferring the incoming call to a telephone number that the caller had previously selected.

Generating the call handling rule may include generating a rule for transferring incoming calls to an extension previously selected by the caller. In some embodiments, generating the call handling rule may include generating a call handling rule for transferring a caller to the extension previously selected by the caller if the caller has selected the extension a predetermined number of times in a row. In further embodiments, generating the call handling rule may include generating a call handling rule for transferring a caller to the extension previously selected by the caller if the caller has selected the extension more than a predetermined number of times in a predetermined time period or more than a predetermined number of times out of a predetermined number of calls.

Some embodiments of the invention provide methods of processing incoming telephone calls including receiving an incoming telephone call from a caller, identifying the caller associated with the incoming telephone call, retrieving a call handling rule for the caller from a database in response to identifying the caller, and processing the incoming call in response to the retrieved call handling rules.

Corresponding call handling units and computer program products are also provided.

It will be understood that the present invention may also be embodied as computer program products. Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
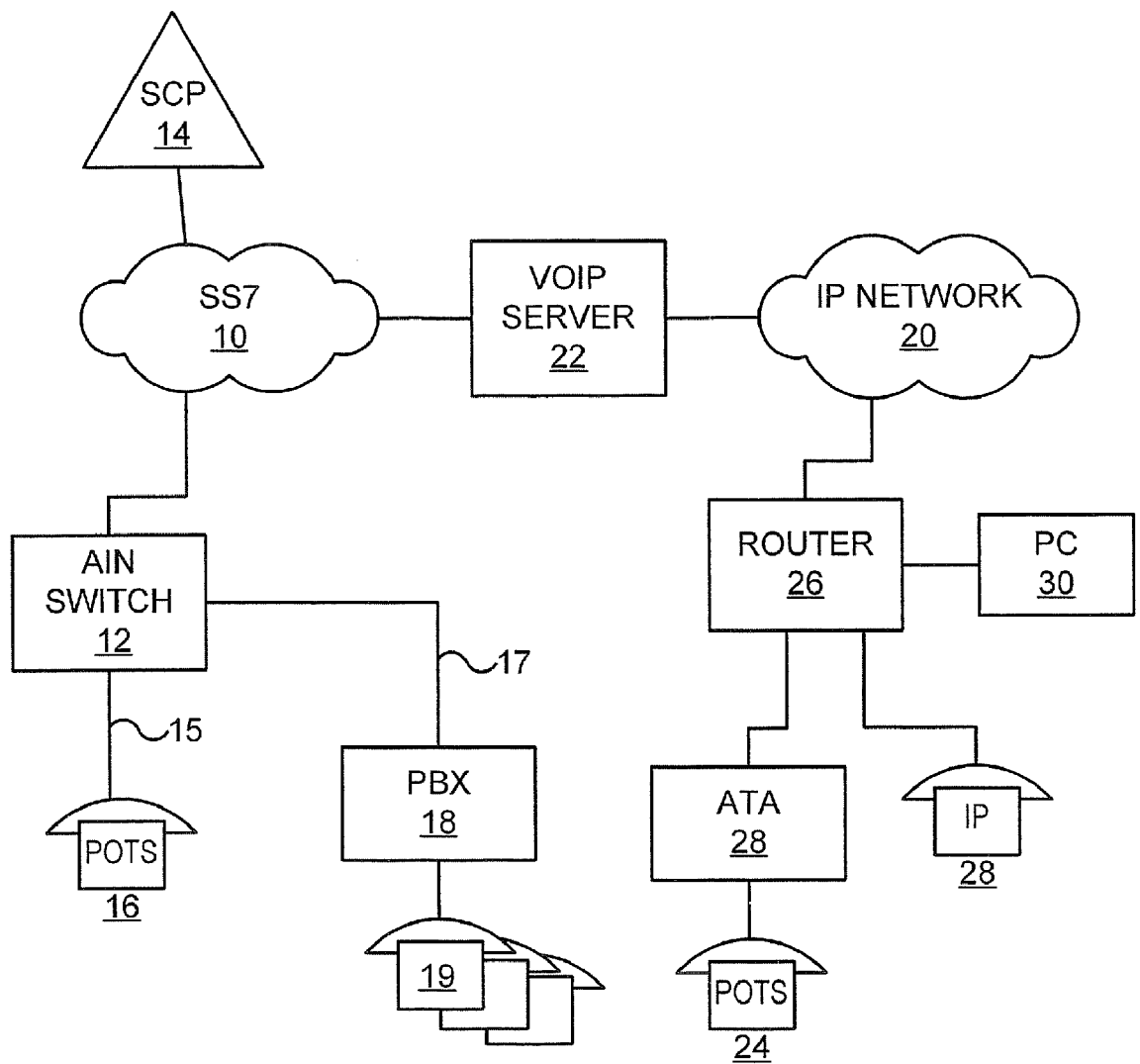
FIG. 1 is a schematic block diagram illustrating systems and/or methods according to embodiments of the invention.

Some embodiments of the invention provide methods of adaptively processing incoming telephone calls in response to an identification of the calling party. The methods include receiving an incoming telephone call from a caller, identifying the caller associated with the incoming telephone call, and processing the incoming call in response to a call handling rule generated in response to a menu selection made in a previous incoming call from the caller.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including magnetic storage devices such as hard disks, optical storage devices such as CD ROMs, DVD-ROMs and the like, and semiconductor based storage devices such as flash memory.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

As discussed in the background, advanced call handling functions may be provided using advanced intelligent network (AIN) enabled switches, PBX terminals and/or VoIP application servers. One common advanced call handling function is referred to as preferred call forwarding or selective call forwarding. In a system configured for preferred (or selective) call forwarding, a user may pre-program call forwarding instructions for specific incoming callers based on identification of the incoming call. For example, an incoming call may be routed to a "forward to" number based on an identification of the incoming caller.

However, in conventional call handling systems, preferred call forwarding rules are typically programmed into the system by the user. In contrast to conventional call handling systems, in some embodiments of the invention, selective call forwarding may be automatically and/or adaptively implemented for incoming callers based on a history of incoming call processing patterns for particular callers. Moreover, according to some embodiments of the invention, customized greetings and/or IVR menus may be provided to an incoming caller based on the caller's previous calling patterns. As used herein, an Interactive Voice Response (IVR) system includes any system in which an audible message or menu is played to an incoming caller, and the caller is invited to select a menu option or enter an extension number by voice or by keypad entry in response to the audible menu.

FIG. 1 is a schematic block diagram illustrating systems and/or methods according to embodiments of the invention. Referring to FIG. 1, a telephone communication system in which embodiments of the invention may be implemented may include a service control point (SCP) 14 that communicates with a central office switch 12, for example through an SS7 signaling network 10. The central office switch 12 may in some embodiments be an advanced intelligent network (AIN) switch 12, that is capable of advanced call handling functions. The AIN switch 12 may in some embodiments be configured to provide Centrex services, such as incoming call handling services, to a customer premises equipment, such as an analog telephone 16 connected to the AIN switch 12 via a twisted-pair line 15.

In some cases, the customer premises equipment may include a PBX 18 connected to the AIN switch 12 or to a standard central office switch through a high capacity trunk 17. The PBX 18 may serve one or more analog and or digital telephones 19. The PBX 18 may handle incoming call processing functions for the attached telephones 19.

Voice over IP (VoIP) services may also be provided in the network by a VoIP service provider that operates a VoIP server 22. The VoIP server 22 is connected to the SS7 signaling network 10 as well as to an IP network 20, such as the Internet. A router 26 may also be connected to the IP network 20 and may communicate with VoIP server 22 using a data communication protocol such as TCP/IP. An IP telephone 28 may communicate through the router 26 with the VoIP server 22. In addition, a standard analog telephone 24 may communicate with VoIP server 22 through the router 26 and an analog terminal adapter (ATA) 28. A personal computer 30 may also connect to the VoIP server 22 through the IP network 20 and the router 26. The PC 30 may be used by a VoIP subscriber to configure the call handling functions of the VoIP server 22.

Embodiments of the invention may provide adaptively customized call handling procedures for identified callers. Accordingly, some embodiments of the invention may be implemented in, for example, an AIN switch 12, a PBX 18, and/or a VoIP server 22. For simplicity, in the following discussion, the unit performing call handling functions will be referred to herein as the "call handling unit." Accordingly, it will be appreciated, that the term "call handling unit" may refer to and AIN switch 12, a PBX 18, a VoIP server 22, and/or any other network element or customer premises equipment that provides call handling functions for a subscriber.

According to some embodiments of the invention, a call handling unit keeps track of incoming calls from identified callers and determines, for example, if a particular identified caller follows a pattern in terms of the call processing requested by the caller. The call processing requested by the caller may include IVR menu selections, extension selections, and the like. The call handling unit may then determine if a rule can be devised to enable faster and/or more efficient handling of calls from the identified caller. If so, the call handling unit may invoke the call handling rule the next time the identified caller dials a telephone number managed by the call handling unit.

In some embodiments, a call handling unit may be configured to provide a standard interactive voice response (IVR) menu to incoming callers that permits incoming callers to select an extension number. The call handling unit may identify incoming callers and keep track of which extension each incoming caller selects. In some embodiments, if a caller repeatedly selects the same extension a predetermined number of times, the call handling unit may establish a rule under which the caller will be automatically transferred to the extension the next time the caller calls in.

In some embodiments, the rule many be established when the caller calls in and selects the extension a predetermined number of times in a row. In other embodiments, the rule may be established when the caller selects the extension more than a predetermined number of times in a predetermined time period or out of a predetermined number of calls. For example, the rule may be established if the caller selects the extension in at least 8 out of the previous 10 calls or at least 5 times in one week. Many different conditions for establishing rules are possible within the scope of the present invention.

When a call is automatically transferred to the predetermined extension in response to a custom rule for an identified caller, the call handling unit may play an announcement to the caller indicating that the call is being automatically transferred to the extension, and inviting the caller to press a predefined key (e.g. the '*' key) or otherwise indicate that they would like to be transferred to an alternate destination, such as the main menu, instead of being automatically transferred to the extension.

In other embodiments, the if the caller repeatedly selects the same extension, the call handling unit may establish a rule under which the option to transfer to the extension is presented as a menu option in the initial menu presented to the caller. As an example, the standard menu presented to incoming callers may be structured as shown in Table 1.

TABLE 1

| Standard Menu | |
|---|---|
| Press | For |
| 1 | Directory |
| 2 | Dial by name |
| 0 | Operator |
| * | Repeat menu |

If an incoming caller repeatedly selects a particular extension (e.g., extension 123), then according to the established rule, a custom menu may be presented to the caller the next time the caller calls in, as shown in Table 2. In the custom menu, transferring to the extension is presented as an option in the initial menu presented to the caller.

TABLE 2

| Custom Menu | |
|---|---|
| Press | For |
| 1 | Directory |
| 2 | Dial by name |
| 3 | Transfer to extension 123 |
| 0 | Operator |
| * | Repeat menu |

Figure 2:
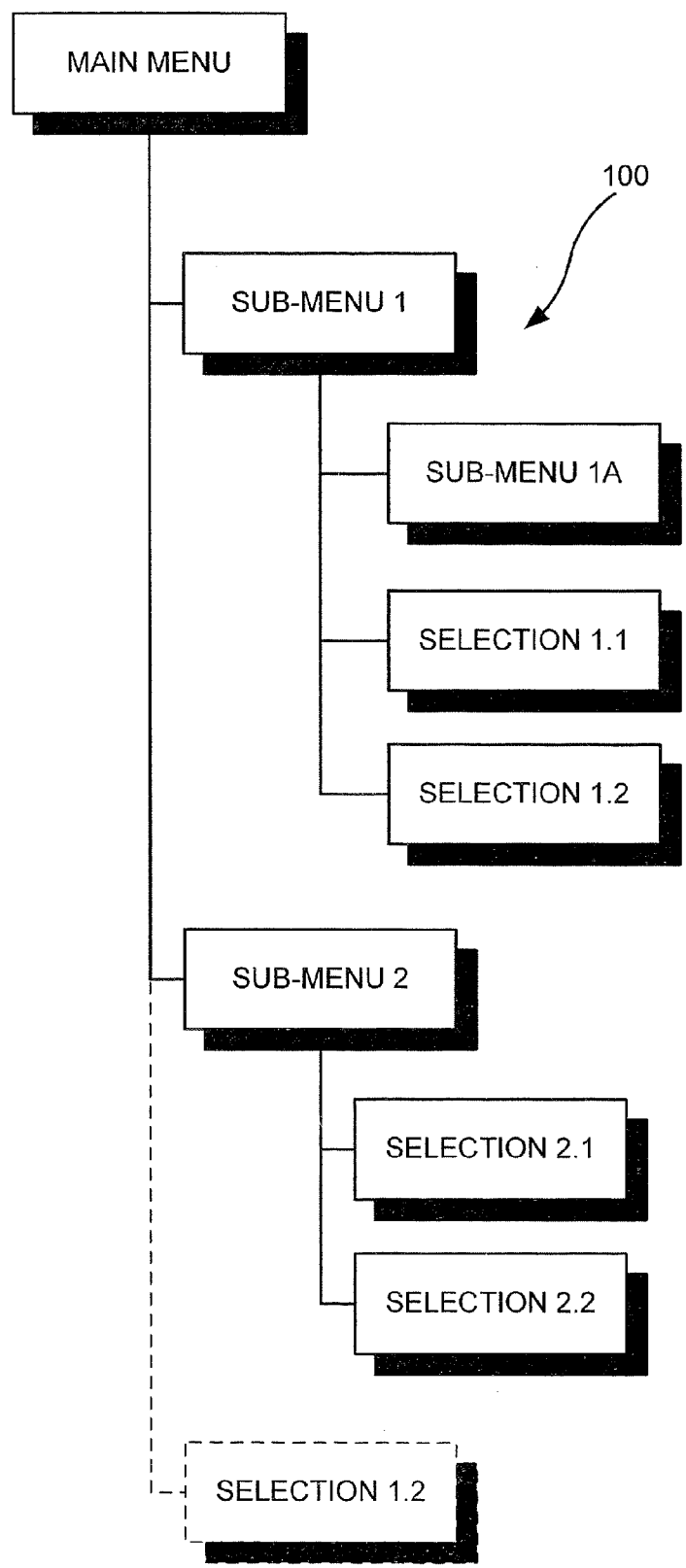
FIG. 2 is a schematic illustration of a customized interactive voice response (IVR) menu structure according to some embodiments of the invention.

In some embodiments, the IVR system may provide a hierarchical menu structure in which an initial menu includes choices for one or more sub-menus, each of which may contain function selections and/or further sub-menu selections. An example of a hierarchical menu structure is shown in FIG. 2. As shown therein, a menu structure 100 includes a Main Menu having two menu options, under which the caller may select Sub-menu 1 or Sub-menu 2. The first Sub-menu (Sub-menu 1) includes three selection options, including a selection for Sub-menu 1A and for Selections 1.1 and 1.2. Sub-menu 2 includes two selections for Selection 2.1 and Selection 2.2.

According to some embodiments of the invention, if a particular caller frequently/repeatedly selects a particular selection from the IVR menu hierarchy, such as such as Selection 1.2, a rule may be established pursuant to which the Main Menu will be customized for the caller to include a selection option for the frequently chosen selection. Accordingly, as shown in FIG. 2 and indicated by broken lines, the Main Menu has been customized to include Section 1.2 as an option in the first level of the IVR menu structure 100.

Figure 3:
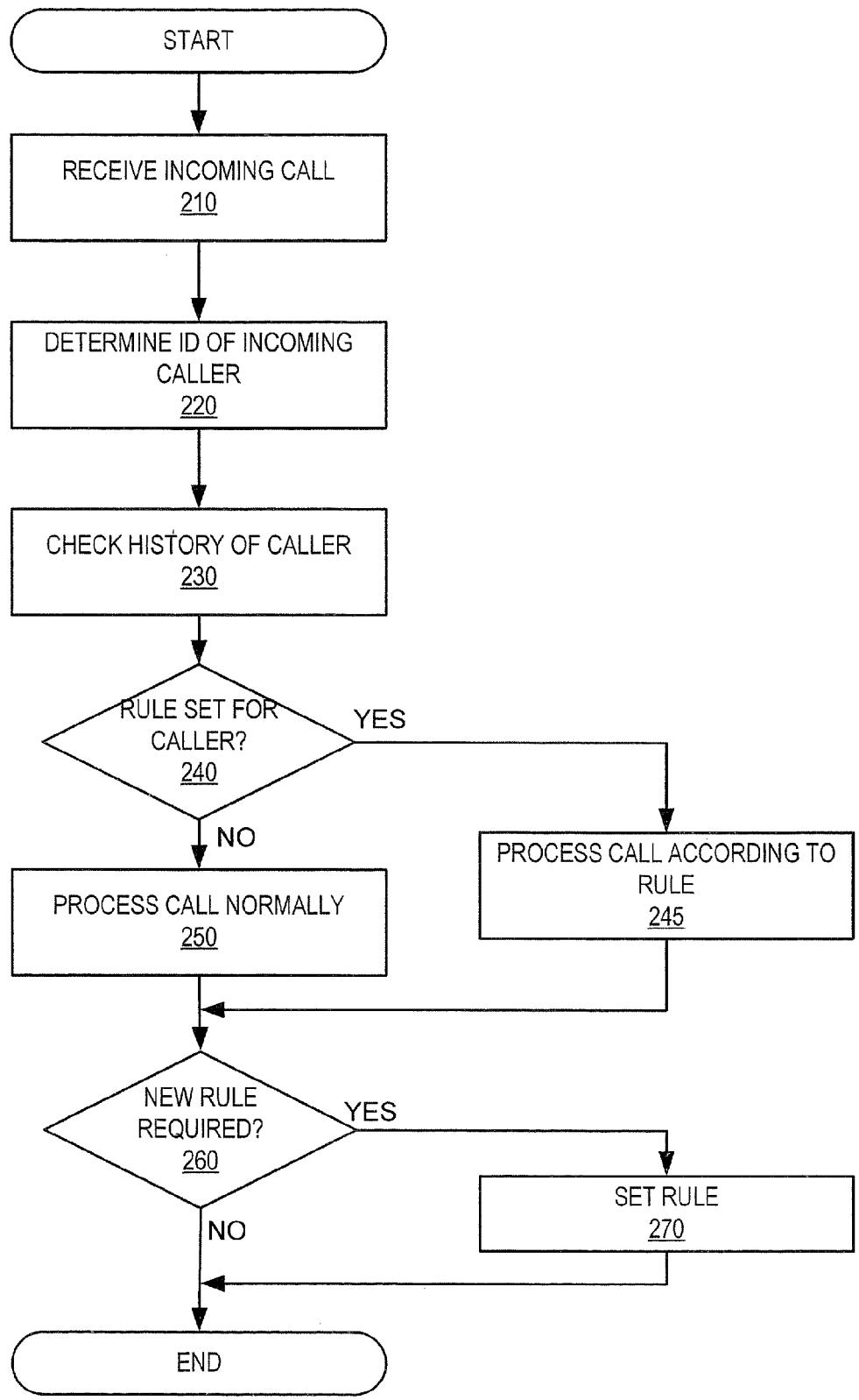
FIG. 3 is a flowchart illustrating operations according to some embodiments of the invention.

FIG. 3 is a flowchart illustrating operations according to some embodiments of the invention. The operations illustrated in FIG. 3 may be performed by a call handling unit, such as the AIN switch 12, the PBX 18, and/or the video IP server 22 shown in FIG. 1.

Referring to FIG. 3, an incoming call is received by the call handling unit (block 210). The call handling unit determines the identity of the incoming caller, for example using conventional caller ID features (block 220). The call handling unit then checks the history of the identified caller (block 230), for example by retrieving a database containing call processing history for the caller. The call processing history for the caller may include, for example, previous menu selections made by the identified caller and/or previous extensions selected by the caller.

The call handling unit then determines, in block 240, if there is a custom rule set for the identified caller. If no rule is set, the call handling unit may process the call normally (block 250) by, for example, presenting a standard IVR menu to the incoming caller. If a rule has been set for the incoming caller, then the call handling unit may process the call according to the rule (block 245). For example, the call handling unit may present a custom menu to the caller including previously selected menu items and/or may automatically transfer the incoming call to a specific destination.

Once the call has been processed, the call handling unit may determine if a new and/or modified rule is required, in response to the call processing selected by the incoming caller combined with the call processing history of the caller. Accordingly, embodiments of the invention may provide adaptive rule-based processing of incoming calls for identified callers. If a new or modified rule is required, the new or modified rule may be set in block 270. Otherwise the operations may terminate.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of processing incoming telephone calls, comprising:
   receiving an incoming telephone call from a caller;
   identifying the caller associated with the incoming telephone call;
   generating a call handling rule in response to a menu selection made in a previous incoming call from the caller; and
   processing the incoming call in response to the call handling rule;
   wherein generating the call handling rule comprises generating a rule for transferring the incoming call to a destination previously selected by the caller; and
   wherein generating the call handling rule comprises generating the call handling rule for transferring the caller to the destination previously selected by the caller if the caller has selected the destination a predetermined number of times in a row.

2. The method of claim 1, wherein processing the incoming call in response to the call handling rule comprises playing an interactive voice response menu to the incoming caller, wherein the interactive voice response menu comprises at least one menu option included in the interactive voice response menu in response to the call handling rule.

3. The method of claim 1, wherein processing the incoming call in response to the call handling rule comprises transferring the incoming call to the destination defined in the call handling rule.

4. The method of claim 3, further comprising playing a message to the caller inviting the caller to indicate that the caller would like to be transferred to an alternate destination instead of being transferred to the destination defined in the call handling rule.

5. The method of claim 1, wherein processing the incoming call in response to the generated call handling rule comprises playing an interactive voice response menu to the incoming caller, wherein the interactive voice response menu comprises a menu option for transferring the incoming call to a destination that the caller had previously selected.

6. A method of processing incoming telephone calls, comprising:
   receiving an incoming telephone call from a caller;
   identifying the caller associated with the incoming telephone call;
   generating a call handling rule in response to a menu selection made in a previous incoming call from the caller; and
   processing the incoming call in response to the call handling rule;
   wherein generating the call handling rule comprises generating a rule for transferring the incoming call to a destination previously selected by the caller; and
   wherein generating the call handling rule comprises generating the call handling rule for transferring the caller to the destination previously selected by the caller if the caller has selected the destination more than a predetermined number of times out of a predetermined number of calls.

7. The method of claim 1, further comprising retrieving the call handling rule for the caller from a database in response to identifying the caller.

8. An apparatus, comprising:
   a memory containing computer readable program code; and
   a call handling unit coupled to the memory and configured to execute the copmuter readable program code to receive an incoming telephone call from a caller, to identify the caller associated with the incoming telephone call, to generate a call handling rule in response to a menu selection made in a previous incoming call from the caller, and to process the incoming call in response to the call handling rule;

wherein the call handling rule comprises a rule for transferring the caller to a destination previously selected by the caller if the caller has selected the destination a predetermined number of times in a row.

9. The apparatus of claim 8, wherein the call handling unit is further configured to transfer the incoming call to the destination defined in the call handling rule.

10. The apparatus of claim 9, wherein the call handling unit is further configured to play a message to the caller inviting the caller to indicate that the caller would like to be transferred to an alternate destination instead of being transferred to the destination defined in the call handling rule.

11. The apparatus of claim 8, wherein the call handling unit is further configured to play an interactive voice response menu to the incoming caller, wherein the interactive voice response menu comprises a menu option for transferring the incoming call to a destination that the caller had previously selected.

12. The apparatus of claim 8, wherein the call handling unit is further configured to play an interactive voice response menu to the incoming caller, wherein the interactive voice response menu comprises at least one menu option included in the interactive voice response menu in response to the call handling rule.

13. An apparatus comprising:
- a memory containing computer readable program code; and
- a call handling unit coupled to the memory and configured to execute the computer readable program code to receive an incoming telephone call from a caller, to identify the caller associated with the incoming telephone call, to generate a call handling rule in response to a menu selection made in a previous incoming call from the caller, and to process the incoming call in response to the call handling rule;

wherein the call handling rule comprises a rule for transferring the caller to a destination previously selected by the caller if the caller has selected the destination more than a predetermined number of times out of a predetermined number of calls.

14. A computer program product for processing incoming calls in a telephone system, the computer program product comprising:
- a tangible, non-transitory computer readable storage medium having computer readable program code embodied in said medium, said computer readable program code comprising:
- computer readable program code configured to receive an incoming telephone call from a caller;
- computer readable program code configured to identify the caller associated with the incoming telephone call;
- computer readable program code configured to generate a call handling rule in response to a previous menu selection made by the caller, the previous menu selection comprising a destination previously selected by the caller, wherein the computer readable program code is further configured to generate the call handling rule for transferring the caller to the destination previously selected by the caller if the caller has selected the destination a predetermined number of times in a row; and
- computer readable program code configured to process the incoming call in response to the call handling rule.

* * * * *

UNITED STATES PATENT AND TRADEMARK OFFICE
CERTIFICATE OF CORRECTION

| | | |
|---|---|---|
| PATENT NO. | : 7,991,125 B2 | |
| APPLICATION NO. | : 11/621399 | |
| DATED | : August 2, 2011 | |
| INVENTOR(S) | : Ryals et al. | |

It is certified that error appears in the above-identified patent and that said Letters Patent is hereby corrected as shown below:

Column 8, Claim 8, Line 61: Please correct "copmuter" to read -- computer --

Signed and Sealed this
Twenty-second Day of November, 2011

David J. Kappos
*Director of the United States Patent and Trademark Office*